United States Patent [19]

Werst

[11] Patent Number: 4,493,047

[45] Date of Patent: Jan. 8, 1985

[54] REAL TIME DATA SMOOTHER AND SIGNIFICANT VALUES SELECTOR

[75] Inventor: Mervin C. Werst, Sellersville, Pa.

[73] Assignee: The United States of America as represented by the Secretary of the Navy, Washington, D.C.

[21] Appl. No.: 365,816

[22] Filed: Apr. 5, 1982

[51] Int. Cl.³ .............................................. G06F 15/31
[52] U.S. Cl. ....................................................... 364/724
[58] Field of Search ................ 364/724, 734, 575, 572

[56] References Cited

U.S. PATENT DOCUMENTS

| | | | |
|---|---|---|---|
| 3,771,167 | 11/1973 | Ross | 364/300 |
| 3,881,651 | 5/1975 | Wilhelm, Jr. | 364/554 |
| 3,946,212 | 3/1976 | Nakao et al. | 364/552 |
| 4,024,385 | 5/1977 | Richards | 364/718 |
| 4,031,365 | 6/1971 | Raggiotti et al. | 364/557 |
| 4,069,412 | 1/1978 | Foster et al. | 364/448 |
| 4,070,708 | 1/1978 | Smallcombe et al. | 364/575 |
| 4,135,248 | 1/1979 | Bluzer | 364/575 |
| 4,137,568 | 1/1979 | Dlugos | 364/734 |
| 4,144,578 | 3/1979 | Mueller et al. | 364/575 |
| 4,352,094 | 9/1982 | Reneric | 364/734 X |
| 4,375,081 | 2/1983 | Blesser | 364/724 |

Primary Examiner—David H. Malzahn
Attorney, Agent, or Firm—Robert F. Beers; Henry Hansen

[57] ABSTRACT

A digital data preprocessor is disclosed wherein consecutive samples of noisy raw digital data telemetered from a dropsonde and decommutated are stored in a first storage stack of registers. Adjacent samples are subtracted, the adjacent first-differences therefrom are subtracted, and the resulting second-differences are stored in a second storage stack of registers. By a comparison of raw data with the second-differences, raw data distorted by noise are measured and subsequently restored to a new value calculated from valid values of raw data samples adjacent to the distorted value. The second-differences are fed through a series of adders to provide a sequence of second-sliding-sums which are stored in a third stack of storage registers. A significant value selector tests the sliding-sums using three different criteria. The results of the tests are used as a basis for selecting raw data samples from the stack for pre-output smoothing of the raw data. The pre-output smoothing and value selection allow for a reduction in the number of data points fed to a processor such as a refraction calculator.

6 Claims, 10 Drawing Figures

REAL TIME DATA SMOOTHER AND SIGNIFICANT VALUES SELECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a real-time digital data preprocessor for a refraction sounding system, and more particularly for a digital data smoother and significant values selector for the system.

Radio propagation characteristics in the atmosphere can be determined by refraction calculations from suitable atmospheric measurements similar to those made for conventional meteorological soundings which determine temperature, pressure, and humidity along a vertical profile. Typically, atmospheric measurement devices commutate and transmit these parameters to a remote receiver via telemetry where they are decommutated and recorded. These telemetry systems, however, lack the accuracy and resolution needed for the refraction calculations because of the noisy data telemetered. At least two different noise conditions occur. One occurs when a strong noise burst having a short time duration distorts only one of the measured telemetered data samples; another occurs when signal strength fades typically for a few seconds or less. During this fade-out the telemetry system's ambient noise level is large in comparison with the faded signal and causes loss of synchronization of the decommutator at the receiver resulting in distortions in measurements that persist beyond the noise duration. Frequent and prolonged losses of decommutator synchronization create gaps in the data large enough to mask information of interest. Systems presently used for calculating the atmosphere's refractivity versus altitude characteristics are therefore inadequate for determining the operating characteristics of radio-frequency propagation systems with the requisite accuracy and resolution.

SUMMARY OF THE INVENTION

Accordingly, an object of the present invention is to provide conventional meteorological sounding data having improved accuracy and resolution needed for refraction calculations. Another object of the invention is to provide high-speed data validation, distortion detection, restoration, significant values selection, smoothing and trend-change compensation. Yet another object of the invention is to provide reliable circuitry for preprocessing, in real-time, raw digital data. A further object of the invention is to provide a reduction of data-storage and concomittant processing-time requirements by preprocessing data in its period or frequency state. Another object of the invention is to provide, in real-time, automatic selecting of significant values from raw digital data for data storage reduction. A further object of the invention is to provide automatic, real-time detection of distorted data and to provide restoration of the data to a more typical or normal value as determined by samples of data preceeding and following the distorted data.

Briefly, these and other objects of the present invention are accomplished as follows. Consecutive samples of noisy raw digital data telemetered from a dropsonde and decommutated are stored in a first storage stack of registers. Adjacent samples are subtracted, the adjacent first differences therefrom are subtracted, and the resulting second differences are stored in a second storage stack of registers. By a comparison of raw data with the second differences, raw data distorted by noise are measured and subsequently restored to a new value calculated from valid values of raw data samples adjacent to the distorted value. The second differences are fed through a series of adders to provide a sequence of second sliding sums which are stored in a third stack of storage registers. A significant value selector tests the sliding-sums using three different criteria. The results of the tests are used as a basis for selecting raw data samples from the first stack for pre-output smoothing of the raw data. The pre-output smoothing and value selection allow for a reduction in the number of data points fed to a processor such as a refraction calculator.

Other objects, advantages and novel features of the invention will become apparent from the following detailed description of the invention when considered in conjunction with the accompanying drawings wherein:

DESCRIPTION OF THE PREFERRED EMBODIMENT

Figures 1, 4:
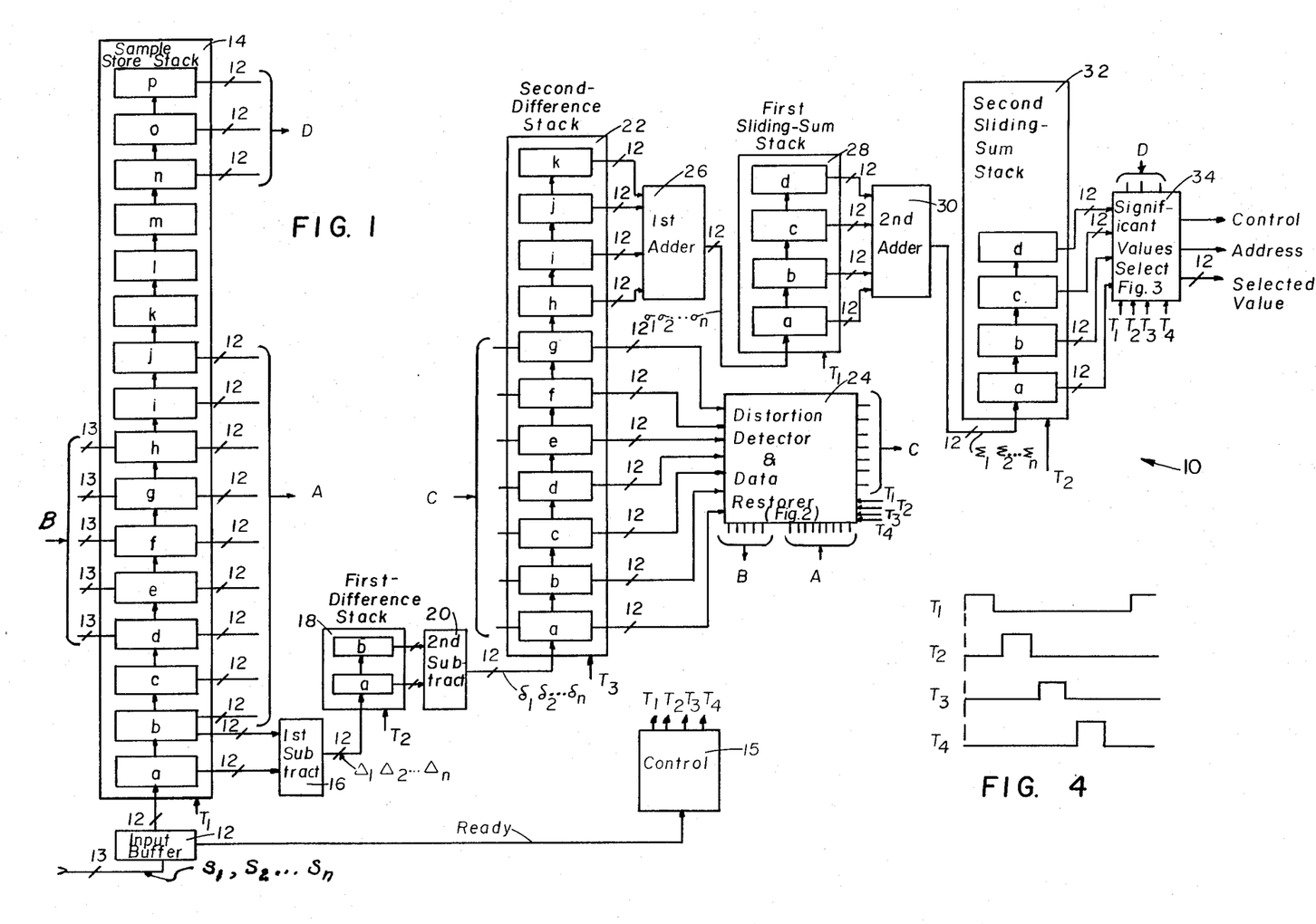
FIG. 1 is a block diagram of a real-time data smoother and significant values selector according to the invention.
FIG. 4 is a timing diagram of clock signals according to the invention.

Referring now to the drawings, wherein like reference characters designate like or corresponding parts throughout the several views, there is shown in FIG. 1 a real-time data smoother and significant values selector 10. A typical data source, not shown, provides an input signal of raw digital data samples comprising a sequence of parallel twelve-bit words $S_1, S_2 \ldots S_n$ to a conventional input buffer 12, which compensates for rate of data flow differences between the source and circuit 10 and also isolates circuit 10 from the source. Buffer 12 receives the samples and passes them sequentially. Buffer 12 holds each sample until the processing of the previous sample is complete. A sample stack 14 comprising sixteen twelve-stage, parallel input/parallel output shift registers, $14a \ldots 14p$ is connected to receive the samples from buffer 12. Each register of stack 14 is capable of storing one twelve-bit word and, when pulsed by clock signal $T_1$ from a controller 15 at the appropriate time, shifts the stored samples through registers $14a \ldots 14p$. The stored samples are shifted through registers $14a \ldots 14p$ incrementally each time a new sample is received from buffer 12 and in synchronism with the signal $T_1$. Stack 14 is designed to contain 16 consecutive samples in order to assure availability of three selectable consecutive samples, (e.g. after the sixteenth clock pulse $S_1$, $S_2$ and $S_3$) for smoothing upon the event of a significant value detection further discussed hereinbelow. To aid understanding of the invention, data samples $S_1 \ldots S_{16}$ are described as occupying registers $14p \ldots 14a$. Such a condition is true only after the occurrence of the sixteenth $T_1$ signal following entry of sample $S_1$ into input buffer 12.

Figure 2:
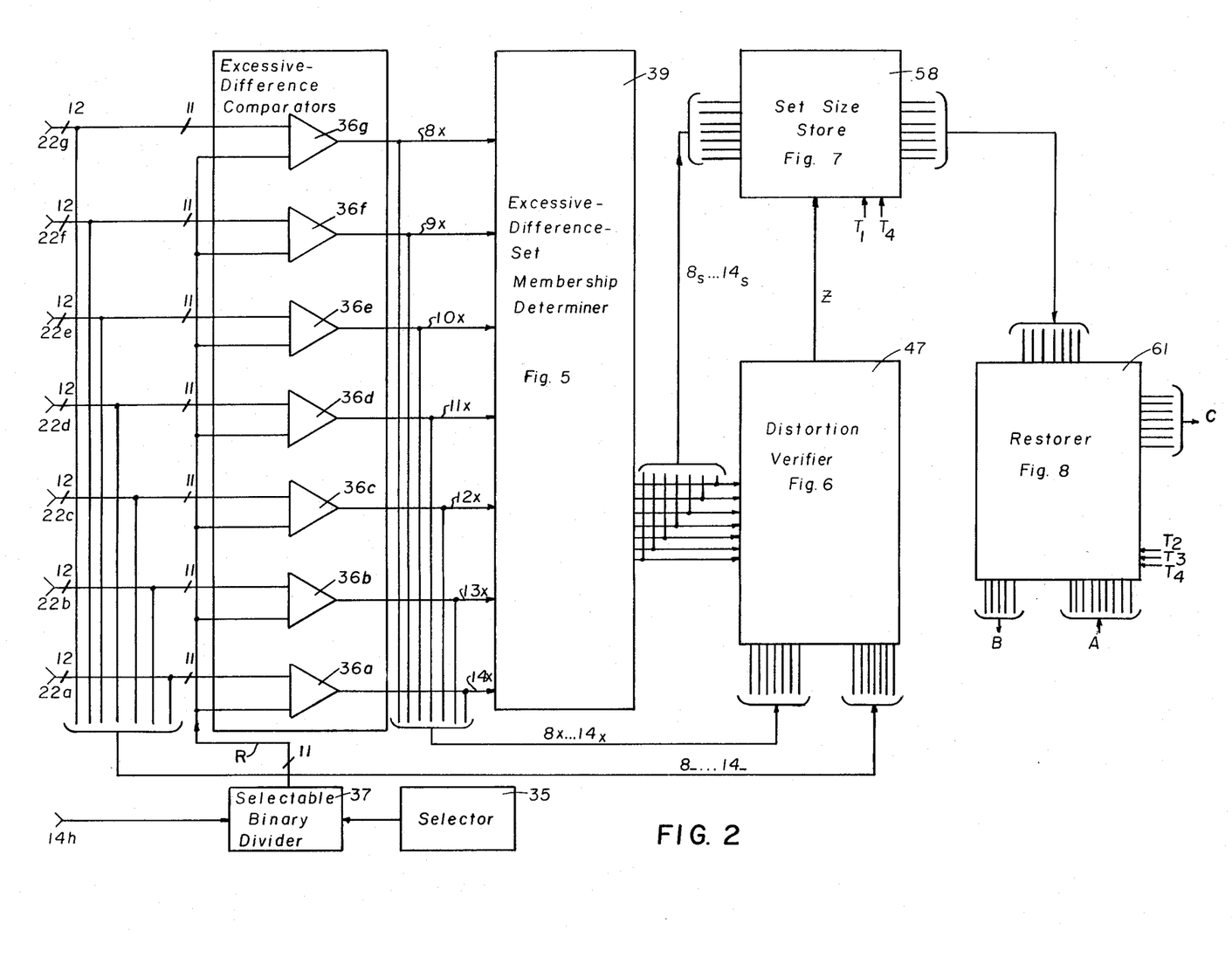
FIG. 2 is a block diagram of a distortion detector and data restorer of the invention shown in FIG. 1.

A first or raw-data-sample subtractor 16 is connected to receive each word sample passing through registers $14a$ and $14b$ and to provide first-difference signals $\Delta_1$, $\Delta_2 \ldots \Delta_n$ by differencing adjacent samples, i.e., $S_2-S_1$, $S_3-S_2 \ldots S_n-S_{n-1}$, respectively. A first-difference stack 18 comprising two twelve-stage, parallel input/parallel output shift registers $18a$ and $18b$ are connected to receive signals $\Delta_1$, $\Delta_2 \ldots \Delta_n$ in register $18a$ and to shift them into the register $18b$ at the occurrence of a clock signal $T_2$. A second difference subtractor 20, similar to first subtractor 16 is connected to receive adjacent signals from first-difference registers $18a$ and $18b$ and provide second-difference signals $\delta_1, \delta_2 \ldots \delta_n$, respectively by differencing adjacent first-difference signals, i.e., $2-1, 3-2, \ldots n-n-1$. A second-difference stack 22 comprising eleven twelve-stage, parallel input/parallel output shift registers $22a \ldots 22k$ is connected to receive the second-difference signals $\delta_1, \delta_2 \ldots \delta_n$. Each successive second-difference signal $\delta_1, \delta_2 \ldots \delta_n$ is stored in consecutive registers $22k \ldots 22a$. Referring to FIGS. 1 and 2, a distortion detector and data restorer 24 is connected to receive second-difference signals stored in registers $22g \ldots 22a$ and raw data samples A stored in registers $14j \ldots 14b$ for providing restored and strobe data B to registers $14h \ldots 14d$ and a clear signal C to registers $22g \ldots 22a$. Referring now to FIG. 2, excessive difference comparators $36g \ldots 36a$ are connected to receive second-difference signals from storage registers $22g \ldots 22a$ and a distortion threshold reference R from a binary divider 37. Divider 37 is connected to receive sample S9 from storage register $14h$ and shift it to obtain the distortion threshold reference comprising a fractional value of the sample. Comparator $36g$ compares the second-difference signal $\delta_8$ stored in register $22g$ with reference R. If the absolute value of the second-difference in $22g$ is greater than the absolute value of reference R, then the second-difference in register $22g$ is considered a first-signal $8x$ in a set of excessive second differences. The second-difference signals in registers $22f \ldots 22a$ are also compared in comparators $36f \ldots 36a$ respectively to determine which of second-difference signals $\delta_9 \ldots \delta_{14}$ are also in excess of the distortion threshold reference R. A membership determiner 39 is connected to receive signals $8x \ldots 14x$ and to provide a membership-set of excessive difference signals $8s \ldots 14s$. The following logic expressions for signals $8s \ldots 14s$ are implemented in FIG. 5.

Figure 5:
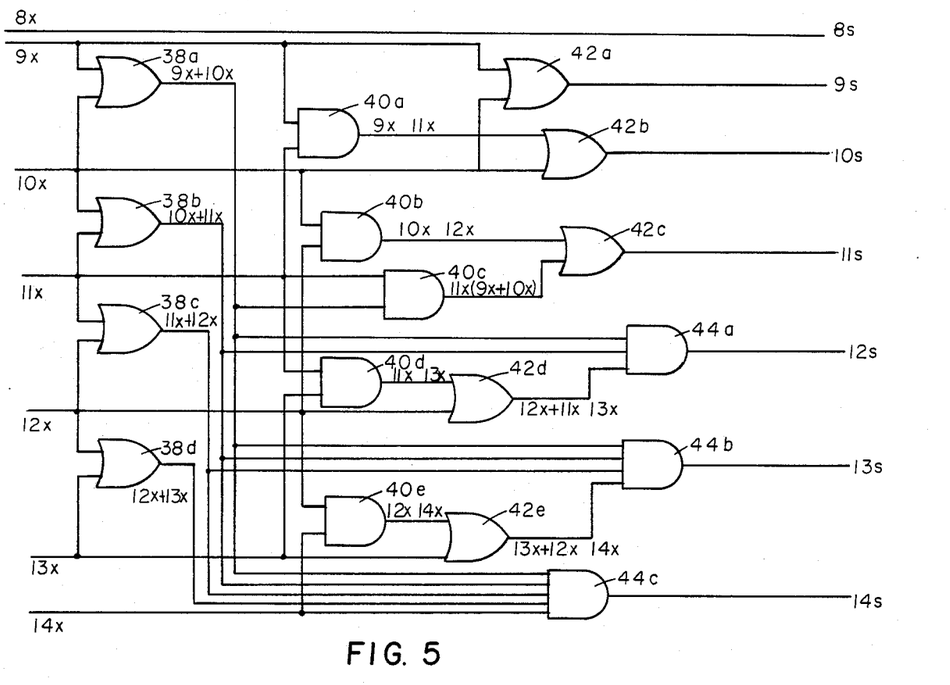
FIG. 5 is a logic diagram of an excessive difference set membership determiner of FIG. 2.

$8_s = 8_x$
$9_s = 10_x + 9_x$
$10_s = 10_x + 9_x 11_x$
$11_s = (9_x + 10_x) 11_x + 10_x 12_x$
$12_s = (9_x + 10_x)(10_x + 11_x)(12_x + 11_x 13_x)$
$13_s = (9_x + 10_x)(10_x + 11_x)(11_x + 12_x)(13_x + 12_x 14_x)$
$14_s = (9_x + 10_x)(10_x + 11_x)(11_x + 12_x)(12_x + 13_x) 14_x$

Referring to FIG. 5, and using boolean algebra for descriptive purposes, OR gate $38a$ is connected to receive signals $9_x$ and $10_x$ and to provide signal $(9_x + 10_x)$. OR gate $38b$ is connected to receive signals $10_x$ and $11_x$ and to provide signal $(10_x + 11_x)$. OR gate $38c$ is connected to receive signals $11_x$ and $12_x$ and to provide signal $(11_x + 12_x)$. OR gate $38d$ is connected to receive signals $12_x$ and $13_x$ and to provide signal $(12_x + 13_x)$. AND gate $40a$ is connected to receive signals $9_x$ and $11_x$ and to provide $(9_x 11_x)$. AND gate $40b$ is connected to receive signals $10_x$ and $12_x$ and to provide signal $(10_x 12_x)$. AND gate $40c$ is connected to receive signal $(9_x + 10_x)$ and $11_x$ and to provide signal $[(9_x + 10_x) 11_x]$. AND gate $40d$ is connected to receive signals $11_x$ and $13_x$ and to provide signal $(11_x 13_x)$. AND gate $40e$ is connected to receive signals $12_x$ and $14_x$ and to provide signal $(12_x 14_x)$. OR gate $42a$ is connected to receive signals $9_x$ and $10_x$ and to provide signal $9_s$. OR gate $42b$ is connected to receive signal $10_x$ and $(9_x 11_x)$ and to provide signal $10_s$. OR gate $42c$ is connected to receive signals $10_x 12_x$ and $[(9_x + 10_x) 11_x]$ and to provide signal $11_s$. OR gate $42d$ is connected to receive signals $11_x 13_x$ and $12_x$ and to provide $(12_x + 11_x 13_x)$. OR gate $42e$ is connected to receive signal $12_x 14_x$ and $13_x$ and to provide signal $(13_x + 12_x 14_x)$. AND gate $44a$ is connected to receive signals $(9_x + 10_x)$, $(10_x + 11_x)$ and $(12_x + 11_x 13_x)$ and to provide signal $12_s$. AND gate $44b$ is connected to receive signals $(9_x + 10_x)$, $(10_x + 11_x)$, $(11_x + 12_x)$ and $(13_x + 12_x 14_x)$ and to provide signal $13_s$. AND gate $44c$ is connected to receive $(9_x + 10_x)$, $(10_x + 11_x)$, $(11_x + 12_x)$, $(12_x + 13_x)$ and $14_x$ to provide signal $14_s$. A single second-difference signal below threshold R is considered excessive if bounded by second-difference signals exceeding threshold R. The most recent of the consecutive excessive second-difference signals is a final value in the excessive second-difference signal set. Distortion verifier 47 is connected to receive the signals identified as sign bits $8 \ldots 14$, which indicates for each second-difference signal whether it is negative or not, the membership-set of excessive second-differences $8_s \ldots 14_s$, and the second-difference signals $8_x \ldots 14_x$ for providing a signal Z which indicates that distortion is present. If the membership-set consisting of the first and final values along with their intervening values, is found to contain at least two second-difference signals exceeding distortion threshold R and if at least two of them are of opposite sign, the samples in stack 14 from which the second-differences were derived are considered distorted, and the suspect samples are replaced with a set of values in better agreement with the validated samples bounding the suspect set. The validated samples are those associated with the top (first) and bottom (final) second-differences signals in the membership set. For example, if the excessive differences signals are comprised of second-differences $8x \ldots 11x$, inclusive, then samples S9 and S12 in registers $14h$ and $14e$ respectively are considered the bounding valid samples and are used to restore samples S10 and S11. The following logic expression was utilized to derive signal Z and to implement the function in hardware.

Figure 6:
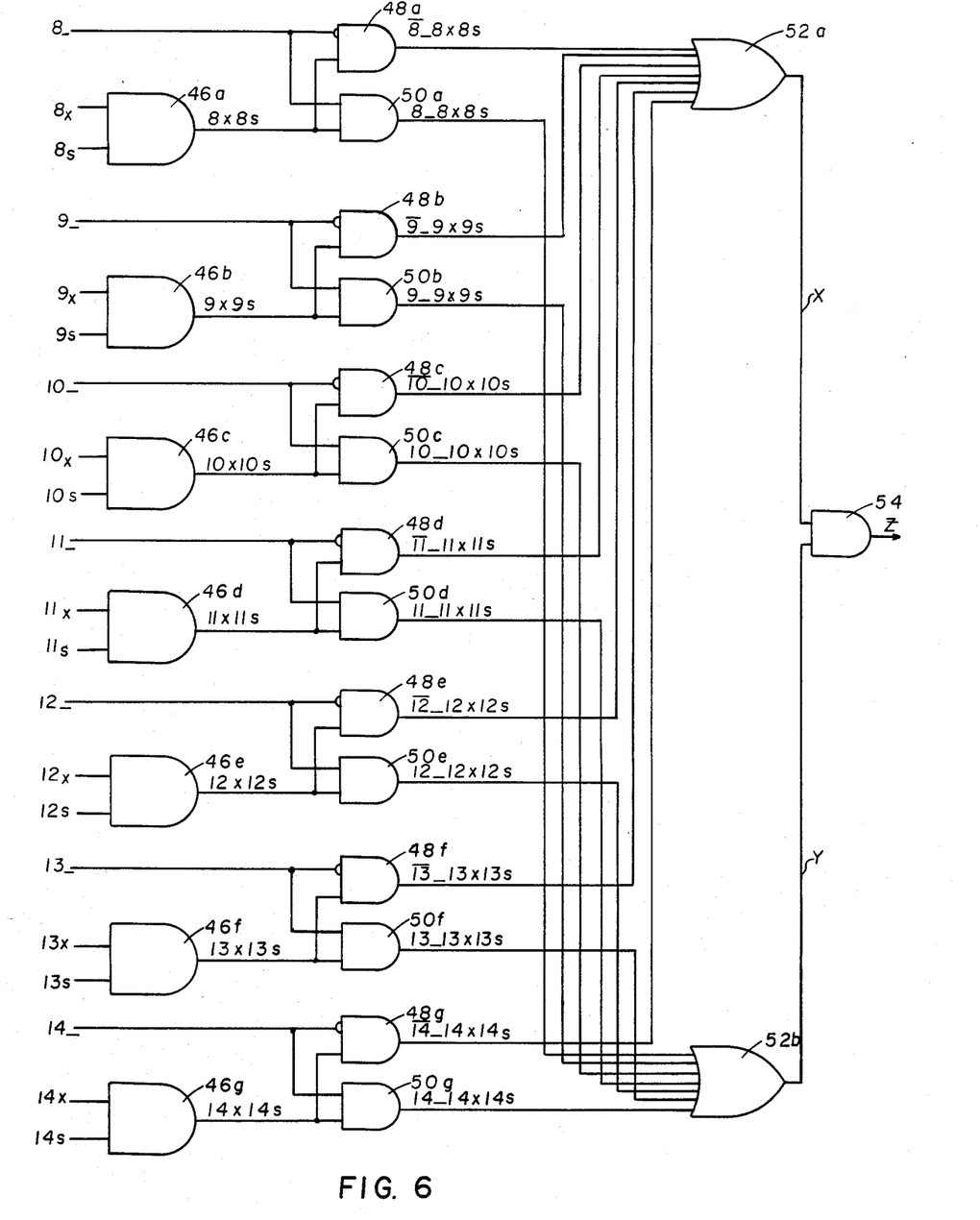
FIG. 6 is a logic diagram of a distortion verifier of FIG. 2.

$Z = 8.(\overline{9.9_x 9_s} + \overline{10.10_x 10_s} + \overline{11.11_x 11_s}$
$\quad - \overline{12.12_x 12_s} + \overline{13.13_x 13_s} + \overline{14.14_x 14_s})$
$\quad - 8.(9.9_x 9_s + 10.10_x 10_s + 11.11_x 11_s$
$\quad - 12.12_x 12_s + 13.13_x 13_s + 14.14_x 14_s)$ When Z is true, distortion is present.

Figure 7:
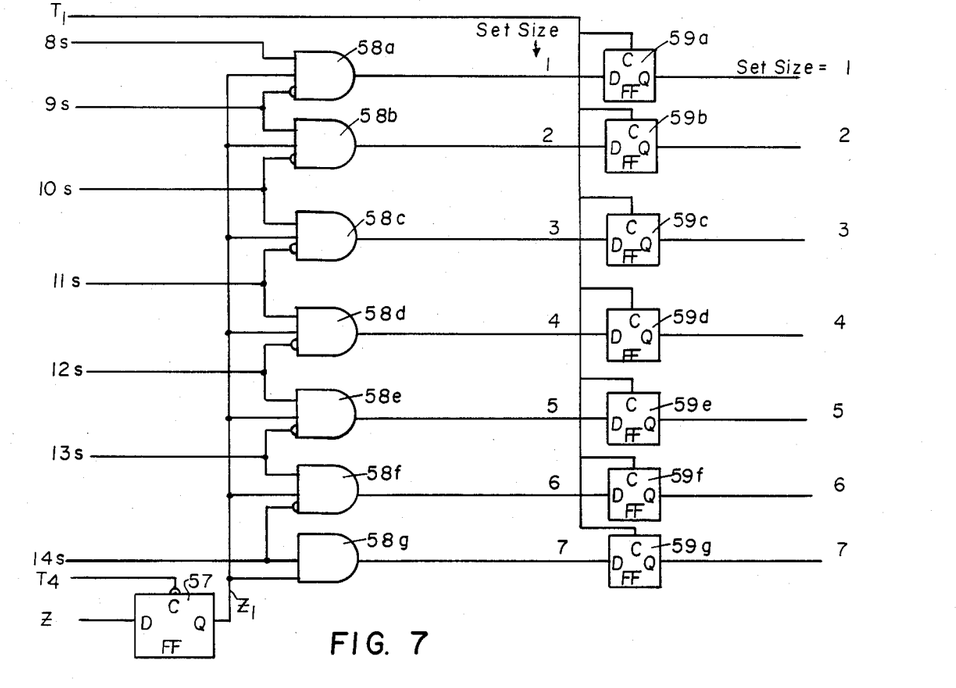
FIG. 7 is a logic diagram of a set size storer of FIG. 2.

Referring to FIG. 6, and using boolean algebra for descriptive purposes, AND gates 46a ... 46g are connected to receive $8_x$ and $8_s$ ... $14_x$ and $14_s$ respectively and to provide logic output signals of $(8_x8_s)$ ... $(14_x14_s)$ respectively. AND gates 48a ... 48g each have an inverting input and a noninverting input. The inverting input of AND gates 48a ... 48g are connected to receive signals 8 ... 14 respectively and the noninverting inputs are connected to receive signals $(8_x8_s)$ ... $(14_x14_s)$ respectively and to provide $(8.8_x8_s)$ ... $(14.14_x14_s)$ respectively. AND gates 50a ... 50g are connected to receive signals 8 and $(8_x8_s)$ ... 14 and $(14_x14_s)$ and provide $(8.8_x8_s)$ ... $(14.14_x14_s)$ respectively. OR gate 52a is connected to receive signals $(8.8_x8_s)$ ... $(14.14_x14_s)$ from AND gates 48a ... 48g respectively, and to provide signal X indicative of at least one positive excessive set member consisting of $(8.8_x8_s)+(9.9_x9_s)+(10.10_x10_s)+(11.11_x11_s)+(12.12_x12_s)+(13.13_x13_s)+(14.14_x14_s)$. OR gate 52b is connected to receive signals $\overline{(8.8_x8_s)}$ ... $\overline{(14.14_x14_s)}$ from AND gates 50a ... 50g respectively, and to provide signal Y indicative of at least one negative excessive set-member consisting of $\overline{(8.8_x8_s)}+\overline{(9.9_x9_s)}+\overline{(10.10_x10_s)}+\overline{(11.11_x11_s)}+\overline{(12.12_x12_s)}+\overline{(13.13_x13_s)}+\overline{(14.14_x14_s)}$. AND gate 54 is connected to receive signal X and Y and to provide signal Z consisting of signal (XY) indicating both that distortion is present and that data restoration should be enabled when at least two excessive set members of opposite signs are present. A set-size storer 58 is connected to receive membership-set signals $8_s$ ... $14_s$, clock signals $T_1$ and $T_4$ and signal Z for determining and storing the number of excessive differences of the membership-set and providing set-size signls 1 ... 7. Referring to FIG. 7, a flip-flop 57 is connected to receive signal Z and to clock it out as a function of inverted $T_4$ clock signal $(\overline{T_4})$ providing therefrom signal $Z_1$. AND gates 58a ... 58f each have three inputs, two of which are noninverting and one of which is inverting. AND gates 58a ... 58f are connected to receive signals $8_s$ ... $13_s$ and $Z_1$ on the noninverting inputs respectively and $9_s$ ... $14_s$ on the inverting inputs respectively. AND gate 58g is connected to receive signals $Z_1$ and $14_s$ for providing set-size signal 7 therefrom. The noninverting inputs of 58a ... 58g which receive signal $Z_1$, clocked by $\overline{T_4}$ enable the gate outputs when restoration is required. AND gates 58a ... 58g provide set-size signals 1 ... 7 respectively. Flip-flops 59a ... 59g are connected to receive and store set-size signals 1 ... 7 and to provide outputs thereof when they receive clock signal $T_1$ which is also connected thereto and to maintain those outputs while restoration is effected and until occurrence of the next $T_1$ signal.

Referring to FIG. 2, restorer 61 is connected to receive set-size signals 1 ... 7, samples A, clock signals $T_2$, $T_3$ and $T_4$, to provide restored samples and restoration strobe B, and restored second-difference clear-signals C. The data restorer calculates an average of two values (one addition and one division by two) to make each restoration. Three methods are used to calculate the average-of-two: (1) using two first-neighbors; (2) using two second-neighbors; or (3) using two third-neighbors. A sample's two first-neighbors are the sample immediately preceding and the sample immediately following the sample to be restored. The second-neighbors are the second sample preceding and the second sample following the sample to be restored. For example, if sample $S_{10}$ is to be restored, it's first neighbors are samples $S_9$ and $S_{11}$; its second neighbors are $S_8$ and $S_{12}$; and its third neighbors are sample $S_7$ and $S_{13}$. If a single sample is to be restored, it is set equal to the average of its two first (immediate) neighbors. If two samples are to be restored, each one is set equal to the average of its two second-neighbors. If three samples are to be restored, the center one is set equal to the average of its two second-neighbors then the remaining two samples are restored by setting each equal to the average of its two first-neighbors. If four samples are to be restored, the two central samples are restored by setting each equal to the average of its two third-neighbors, then the two remaining samples are restored by setting each equal to the average of its two first-neighbors. If five samples are to be restored, the central sample is restored by setting it equal to the average of its two third neighbors, then the two outer-most samples are restored by setting them equal to the average of their two second-neighbors and finally the remaining two samples are restored by setting them equal to their two first-neighbors.

Table 1 hereinbelow, using algebraic notations, shows the averages implemented for data restoration for set size 3, 4, 5, 6 or 7 and in terms of samples $S_1$ ... $S_{16}$ occupying registers 14p ... 14a after valid data have been shifted to fill all stacks.

TABLE I

| Set Sizes | Averages Implemented |
|---|---|
| 3 | $(S_9) = \dfrac{(S_8) + (S_{10})}{2}$ |
| 4 | $(S_9) = \dfrac{(S_7) + (S_{11})}{2}$ |
|   | $(S_{10}) = \dfrac{(S_8) + (S_{12})}{2}$ |
| 5 | $(S_9) = \dfrac{(S_8) + (S_{10})}{2}$ |
|   | $(S_{10}) = \dfrac{(S_8) + (S_{12})}{2}$ |
|   | $(S_{11}) = \dfrac{(S_{10}) + (S_{12})}{2}$ |
| 6 | $(S_9) = \dfrac{(S_8) + (S_{10})}{2}$ |
|   | $(S_{10}) = \dfrac{(S_7) + (S_{13})}{2}$ |
|   | $(S_{11}) = \dfrac{(S_8) + (S_{14})}{2}$ |
|   | $(S_{12}) = \dfrac{(S_{11}) + (S_{13})}{2}$ |
| 7 | $(S_9) = \dfrac{(S_7) + (S_{11})}{2}$ |
|   | $(S_{10}) = \dfrac{(S_9) + (S_{11})}{2}$ |
|   | $(S_{11}) = \dfrac{(S_8) + (S_{14})}{2}$ |
|   | $(S_{12}) = \dfrac{(S_{11}) + (S_{13})}{2}$ |
|   | $(S_{13}) = \dfrac{(S_{11}) + (S_{15})}{2}$ |

Figure 8:
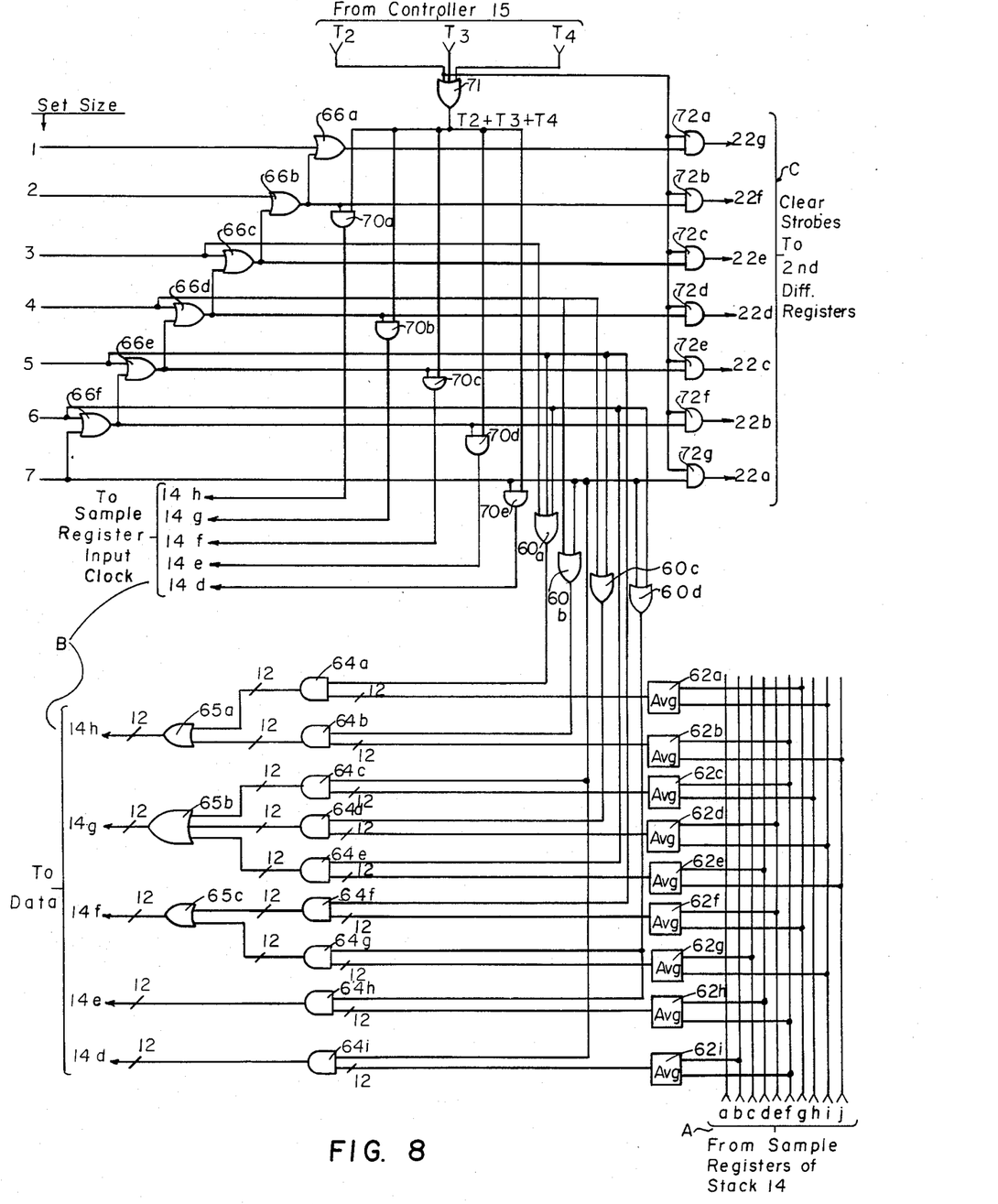
FIG. 8 is a logic diagram of a restorer of FIG. 2.

FIG. 8 shows restorer 61 in more detail and is herein described using boolean algebra notation. OR gate 71 is connected to receive clock signals $T_2$, $T_3$ and $T_4$ for providing sample-restoration signal $(T_2+T_3+T_4)$. OR gates 66a ... 66f are connected to receive set-size signal 1 ... 6 respectively on a first input. Each second input of OR gate 66a ... 66e is connected to receive the output of the succeeding numbered OR gate 66b ... 66f respectively. The second input of OR gate 66f is connected to receive set-size signal 7. OR gates 66a ... 66f provide the respective set-size signals $(1+2+3+4+5+6+7)$, $(2+3+4+5+6'7)$, $(3+4+5+6+7)$, $(4+5+6+7)$, $(5+6+7)$ and $(6+7)$. AND gates 72a ... 72f are connected receive the output signal respectively from OR gates 66a ... 66f and AND gate 72g is connected to receive set-size signal 7 flip-flop; the other input of each AND gate 72a ... 72g is connected to receive clock signal $T_2$ for providing a clear-strobe pulse to registers 22g ... 22a. Dual-input AND gates 70a ... 70e are connected to receive respectively the outputs of OR gates 66b, 66d, 66e, 66f and set-size signal 7; the other input of the AND gates is connected to receive signal $(T_2+T_3+T_4)$ for providing strobe pulses respectively to registers 14h ... 14d. OR gate 60a is connected to receive set-size signals 3, 5, and 6 and provide set-size signal $(3+5+6)$. OR gate 60b is connected to receive set-size signals 4 and 7 and provide set size signal $(4+7)$. OR gate 60c is connected to receive set-size signals 4 and 5 and provide set-size signal $(4+5)$. OR gate 60d is connected to receive set-size signals 6 and 7 and provide set-size signal $(6+7)$; this gate may be eliminated by obtaining its outputs from OR gate 66f. Averagers 62a through 62i comprise parallel-adders, a device whose output is a representation of the sum of the quantities represented by its inputs, and parallel-shifters for providing a one-bit transposition to accomplish the divide-by-two operation needed to compute the average of the two samples each averager used as inputs from stack 14. The outputs of averages 62a .. . 62i, each supply restored samples to stack 14 through AND gates 64a through 64i respectively. Averager 62a is connected to receive samples $S_{10}$ and $S_8$ and to provide sample $S_8$ plus $S_{10}$ divided by two. Averager 62b is connected to receive samples $S_7$ and $S_{11}$ and provide samples $S_7$ plus $S_{11}$ divided by two. Averager 62c is connected to receive samples $S_9$ and $S_{11}$ and to provide sample $S_9$ plus $S_{11}$ divided by two. Averager 62d is connected to receive samples $S_8$ and $S_{12}$ and to provide sample $S_8$ plus $S_{12}$ divided by two. Averager 62e is connected to receive samples $S_{13}$ and sample $S_7$ and to provide sample $S_{13}$ plus sample $S_7$ divided by two. Averager 62f is connected to receive samples $S_{10}$ and $S_{12}$ and provide sample $S_{10}$ plus $S_{12}$ divided by two. Averager 62g is connected to receive samples $S_8$ and $S_{14}$ and provide sample $S_8$ plus $S_{14}$ divided by two. Averager 62h is connected receive samples $S_{11}$ and $S_{13}$ and to provide sample $S_{11}$ plus $S_{13}$ divided by two. Averager 62i is connected to receive samples $S_{15}$ and $S_{11}$ and to provide sample $S_{15}$ plus $S_{11}$ divided by two.

AND gates 64a through 64i are twelve-bit, two input AND gates each connected to receive the twelve bits the output words from averagers 62a through 62i respectively. When gated with appropriate set-size signals they send the output words to the proper sample register for data restoration as a function of set-size signal. Set-size signal 3 gates the output of averager 62a through AND gate 64a; set size signal 4 gates the outputs of 62b and d through AND gates 64b, and d; set size signal 5 gates the outputs of averagers 62a, a and f through AND gates 64a, d, and f; set size signal 6 gates the outputs of averagers 62a, e, g and h; through AND gates 64a, e, g and h and set size signal 7 gates the outputs of averagers 62b, c, g, h and i through AND gates 64b, c, g, h and i. OR gate 65a is connected to receive the outputs of AND gates 64a and 64b for providing restored data to register 14h. OR gate 65b is connected to receive the outputs of AND gates 64c, d and e for providing restored data to register 14g. OR gate 65c is connected to receive the outputs of AND gates 64f and g for providing restored data to register 14f. AND gates 64h and 64i provide restored data to registers 14e and 14d respectively.

Referring to FIG. 1, again at a time when normal processing has begun and samples $S_1$ ... $S_{16}$ occupy registers 14p ... 14a respectively, first adder 26 is connected to receive the second-difference signals $\delta_1, \delta_2$ ... $\delta_n$ passing through registers 22h ... 22k and to provide first-sliding-sum signals $\sigma_1, \sigma_2$ ... $\sigma_n$ representative of the sum of the second-difference signals at its inputs. $\sigma_n$ is defined herein as equal to $\delta_n + \delta_{n+1} + \delta_{n+2} + \delta_{n+3}$. A first-sliding-sum stack 28 comprising four twelve-stage, parallel input/parallel output shift registers 28a ... 28d is connected to receive signals $\sigma_1, \sigma_2$ ... $\sigma_n$. Each register of stack 28 is capable of storing one twelve-bit word and when pulsed by clock signal $T_1$ from controller 15 at the appropriate time, shifts the stored first-sliding-sum signals $\sigma_1, \sigma_2$ ... $\sigma_n$ through registers 28a ... 28d. A second adder 30 is connected to receive signals $\sigma_1, \sigma_2$ ... $\sigma_n$ and to provide second-sliding-sum signals $\Sigma_1, \Sigma_2$ ... $\Sigma_n$. A second-sliding-sum stack 32 comprising four twelve-stage registers 32a ... 32d is connected to receive signals $\Sigma_1, \Sigma_2$ ... $\Sigma_n$ in registers 32a ... 32d in synchronism with clock signal $T_2$ from controller 15. A significant-values selector 34 is connected to receive $\Sigma_1, \Sigma_2$ ... $\Sigma_n$ and the samples stored in registers 14n, 14o and 14p and to provide a summed or smoothed output signal.

Figure 3:
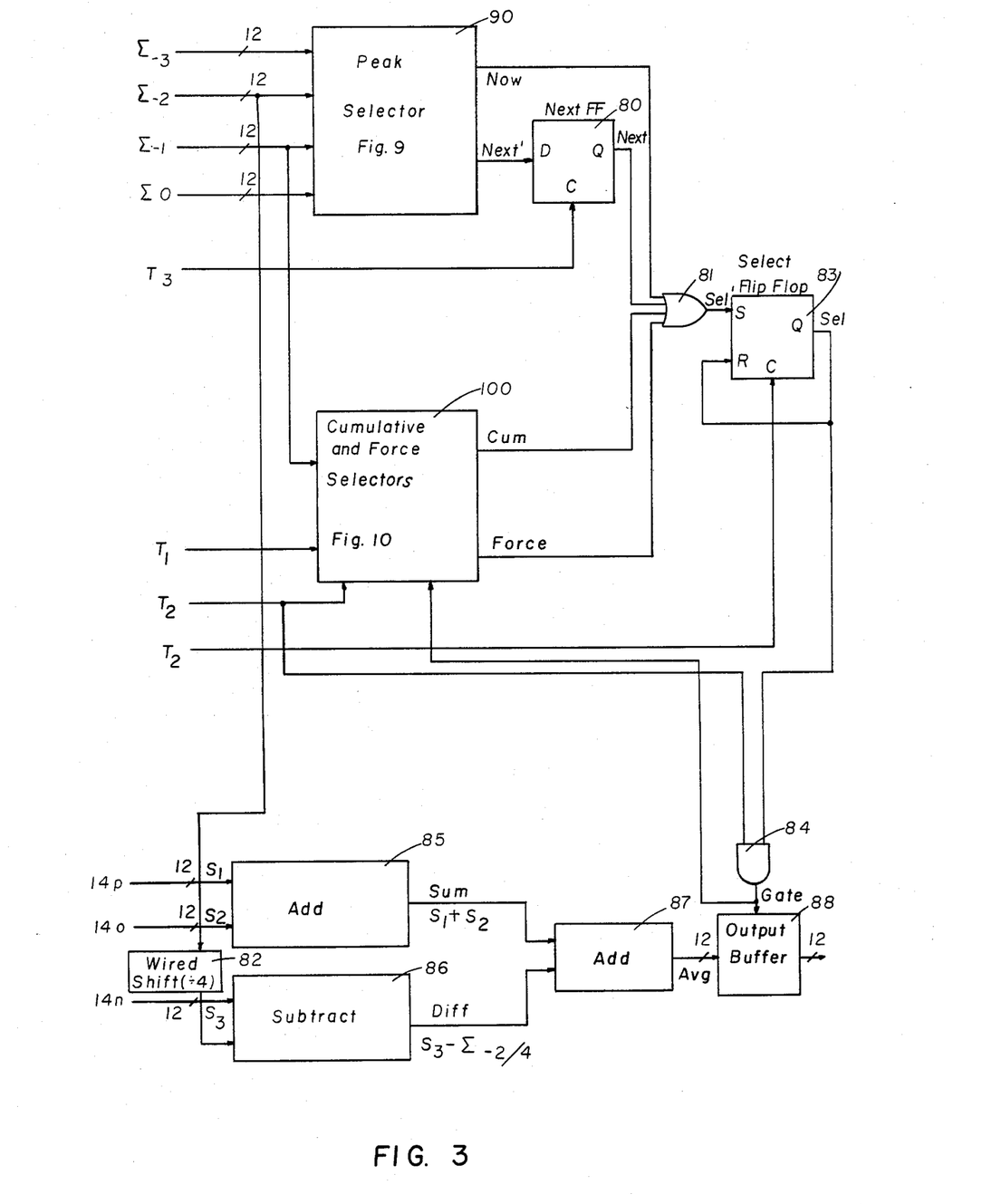
FIG. 3 is a block diagram of a significant value selector.
Figure 9:
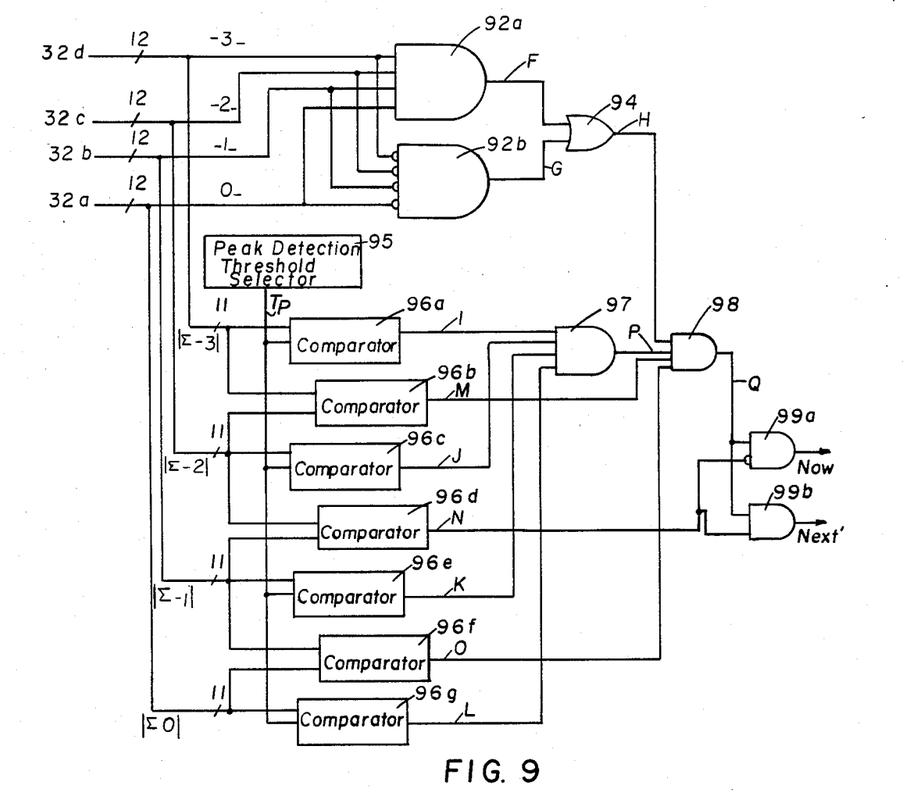
FIG. 9 is a logic diagram of a peak detection selector of FIG. 3.
Figure 10:
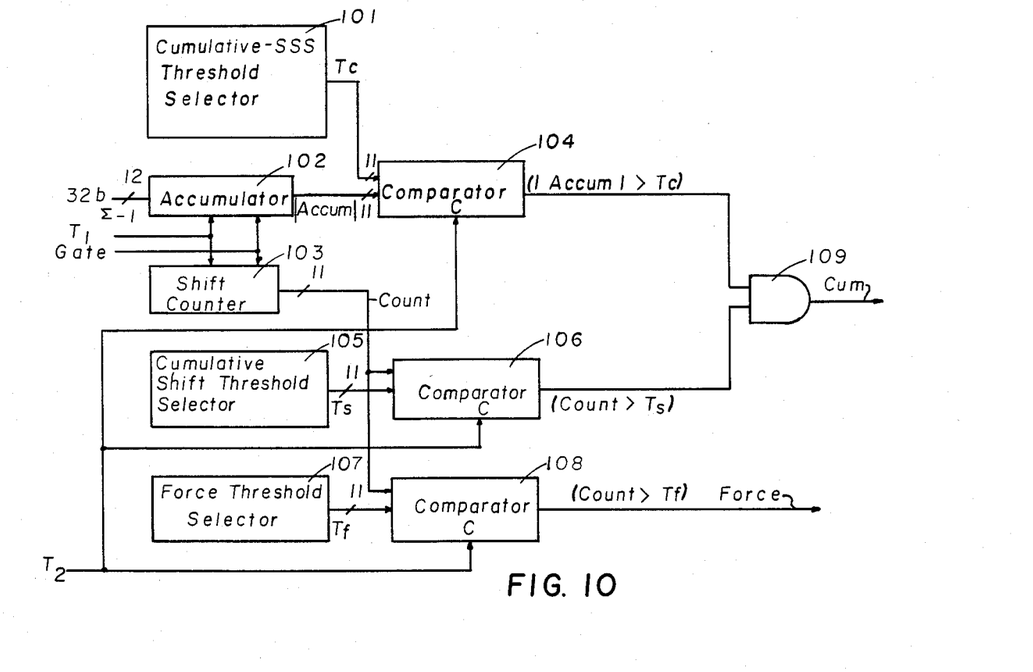
FIG. 10 is a logic diagram of a cumulative and force selection detector of FIG. 3.

Referring to FIG. 3 in which the significant value selector 34 is shown in more detail, signals $\Sigma_1, \Sigma_2$ ... $\Sigma_n$ are used by significant value selector 34 to make a selection by a peak, cumulative or force technique. The peak selection is made whenever the second-sliding-sum and its neighbors are all of the same sign and are displaced from zero by more than a selectable peak threshold $T_o$ and the second-sliding-sum's absolute value is greater than its neighbors' absolute values. A peak selector 90 is connected to receive the second sliding sum signals $\Sigma_{11}$ ... $\Sigma_o$ from second-sliding-sum stack registers 32d ... 32a respectively for providing signals NOW and NEXT'. Signal NOW is indicative that the peak selection technique criteria have been exceeded and signal NEXT' is indicative that the peak selection technique criteria will be exceeded following the next shift of stack 32 by signal $T_2$. Refer now to FIG. 9 wherein peak selector 90 is shown in more detail. Based on the definitions already given for $\Delta_1$ ... $\Delta_n, \delta_1$ ... $\delta_n, \sigma_1$ ... $\sigma_n$ and $\Sigma_1$ ... $\Sigma_n$, when samples $S_1$ ... $S_{16}$ occupy the sample stack 14, stack 32 is occupied by second-sliding-sums $\Sigma_{-3}$ ... $\Sigma_o$, which are examined to determine whether a selection should be made using samples $S_1$, $S_2$ and $S_3$. AND gates 92a and 92b are connected to receive from registers 32d ... 32a the sign bits for signals $\Sigma_{-3}$ ... $\Sigma_o$ represented by $-3$ ... $0$ to provide signal F comprising $[(-3.)(-2.)(-1.)(0.)]$ and signal G comprising $[(-3.)(-2.)(-1.)(0.)]$ respectively. OR gate 94 is connected to receive signal F and G and to provide peak-detect-enable signal H comprising signal (F+G). A peak-detection-threshold selector 95 comprises eleven independent switches each adjustable to provide in a first position a positive voltage sufficient to operate transistor transistor logic (TTL) and indicative of a Hi or one-bit and in a second position a ground or zero voltage indicative of a Low or zero-bit for providing signal $T_p$. Comparators 96a, c, e and g are connected to receive signals $|\Sigma_{-3}| \ldots |\Sigma_o|$ respectively and signal $T_p$ for making a comparison therebetween and providing signals I, J, K and L indicative that $\Sigma_{-3}, \Sigma_{-2}, \Sigma_{-1}$ and $\Sigma_o$ respectively have absolute value greater than signal $T_p$. Comparators 96b, d, and f are connected to receive $|\Sigma_{-3}|, |\Sigma_{-2}|$ and $|\Sigma_{-1}|$ on a first input and $|\Sigma_{-2}|, |\Sigma_{-1}|$ and $|\Sigma_o|$ on a second input for making a comparison therebetween and providing signals M, N, and O indicative that $|\Sigma_{-2}|$ is greater than $|\Sigma_{-3}|$, $|\Sigma_{-1}|$ is greater than $|\Sigma_{-2}|$, and $|\Sigma_{-1}|$ is greater than $|\Sigma_o|$, respectively. AND gate 97 is connected to receive signals I, J, K, and L to provide signal P indicative of signal (I·J·K·L). AND gate 98 is connected to receive signals P, M, O, and H and to provide signal Q. AND gates 99a and 99b are connected to receive signals N inverted and N respectively on a first input and Q on a second input and to provide the signals NOW and NEXT' respectively. Refer now to FIG. 3, a flip-flop 80 is connected to receive signal NEXT' and upon the receipt of clock signal $T_3$ providing an output signal NEXT. The cumulative selection is made if the quantity of shifts of second-sliding-sum stack 32 since the last selection exceeds a selectable cumulative shift threshold $T_s$ and if the accumulation of the second-sliding-sums since the last selection exceeds a selectable cumulative threshold $T_c$. Refer now to FIGS. 3 and 10. A cumulative and force selector 100 is connected to receive signals $\Sigma_{-1}$, $T_1$, $T_2$ and GATE. An accumulator 102 is connected to receive signals $\Sigma_{-1}$ $T_1$ and GATE to provide a signal ACCUM which represents an accumulation of second-sliding-sums occuring between successive $T_1$ signals. A cumulative second-sliding-sum threshold selector 101 provides signal Tc, a cumulative shift threshold selector 105 provides signal Ts, and a force threshold selector 107 provides signal $T_F$. Selectors 101, 105 and 107 are similar to and operate in the same manner as selector 95. A comparator 104 is connected to receive signal ACCUM's absolute value and Tc for making a comparison therebetween and providing a signal, $|ACCUM|>Tc$, indicative that the absolute value of the cumulative second-sliding-sum since the previous signal $T_1$ has exceeded the threshold signal Tc. A counter 103 is connected to receive signals $T_1$ and GATE to provide a signal COUNT indicative of the total number of shifts of sum stack 32 between each successive signal $T_1$. A comparator 106 is connected to receive signals COUNT and Ts for making a comparison therebetween and providing a signal COUNT>Ts indicative that the number of second-sliding-sum shifts has exceeded the cumulative shift threshold. An AND gate 109 is connected to receive signals $|ACCUM|>Tc$ and COUNT>Ts to provide a signal CUM indicative that a cumulative selection should be made. A comparator 108 is connected to receive signals COUNT and $T_F$ for making a comparison therebetween and providing a signal FORCE indicative that signal COUNT is greater than force threshold $T_F$. An OR gate 81 is connected to receive signals NOW, NEXT, CUM and FORCE and to provide signal SEL' indicative that signal (NOW+NEXT+CUM+FORCE) is present. A flip-flop 83 is connected to receive signals SEL', SEL and inverted $T_2$ ($\overline{T_2}$). Signal SEL is the output of flip-flop 83 fed back at the occurrence of signal $\overline{T_2}$. An AND gate 84 is connected to receive signals SEL and $T_2$ and to provide signal GATE therefrom. An adder 85 is connected to receive signals $S_1$ and $S_2$ for providing a signal SUM indicative of the sum of signals $S_1$ and $S_2$. A parallel input/output shift register 82 is connected to receive signal $\Sigma_{-2}$ shift it to the right twice and provide signal $\Sigma_{-2}/4$. A subtractor 86 is connected to receive signals $S_3$ and $\Sigma_{-2}/4$ as minuend and subtrahend respectively and provide a signal DIFF indicative of the difference of signals $S_3$ and $\Sigma_{-2}/4$. An ADDER 87 is connected to receive signals SUM and DIFF for providing a signal AVG. An output buffer 88 having a gating function is connected to receive signals AVG and GATE and to provide signal AVG at the occurrence of signal GATE. Referring to FIGS. 1 and 4 controller 15 is connected to provide a control cycle comprising timing signals $T_1$, $T_2$, $T_3$ and $T_4$ in response to a READY signal from input buffer 12 which initiates controller 15.

In summary, operation of the present invention is explained with reference to FIG. 1. Consecutive samples of noisy raw digital data are stored in a sample storage stack 14. Adjacent samples are subtracted, the adjacent first-difference $\Delta_1, \Delta_2 \ldots \Delta_n$ therefrom are subtracted and the resulting second-differences $\delta_1, \delta_2 \ldots \delta_n$ are stored in a second-difference storage stack 22. A distortion detector and data restorer 24 compares the raw data samples A with the second-differences. Samples distorted by noise are subsequently restored to a new value calculated from valid values of raw samples adjacent to the stored values. The second-differences are fed through first and second adders 26 and 30 to provide a sequence of second-sliding-sums $\Sigma_1, \Sigma_2 \ldots \Sigma_n$ which are stored in a second-sliding-sum stack 32. A significant value selector 34 tests the second-sliding-sums using three different criteria. The results of the test are used as a basis for selecting samples from stack 14 for preoutput smoothing.

It should be apparent that the invention as described hereinabove provides the accuracy, reliability and precision of digital circuitry to improve the accuracy and resolution necessary for refraction calculations. The apparatus provides high speed data validation, distortion detection, restoration, significant value selection, smoothing and trend-change compensation. The apparatus as described provides a reduction of data-storage and concommitant processing time requirements by preprocessing the data in its period or frequency state to provide restoration of distorted samples to a more typical or normal value as determined by valid samples measuremented adjacent thereto.

While the foregoing description and drawings, represent the preferred embodiment of the present invention, it will be obvious to those skilled in the art that various changes and modifications may be made therein without departing from the true spirit and scope of the present invention.

What is claimed is:

1. An apparatus for distortion detection, data restoration and smoothing, and significant value selection for a discrete number of consecutive samples of real time digital data, comprising in combination:

first storage means formed to be connected to receive the samples for providing a first signal of consecutive first-differences of a plurality of the last received samples, a second signal (A) of a plurality of intermediate received samples, a third signal (D) of a plurality of the first received samples, and a ready signal indicative that said first storage means has received the samples;

second storage means connected to receive the first signal for providing a fourth signal of a plurality of last consecutive second-differences and a fifth signal of consecutive first-sliding-sums of a plurality of first consecutive second-differences;

restorer means connected to receive the second signal (A) and the fourth signal for providing to said first storage means a sixth signal (B) of a plurality of samples restored therein and strobe pulses, and to said second storage means a seventh signal (C) of a plurality of clear pulses;

third storage means connected to receive the fifth signal for providing an eighth signal of a plurality of consecutive second-sliding-sums;

selector means connected to receive the eighth signal and the third signal (D) for providing consecutive smoothed, restored samples; and control means connected to receive the ready signal for providing control signals to control said first storage means, second storage means, restorer means, third storage means, and selector means.

2. The apparatus of claim 1 wherein said first storage means comprises:

a plurality of first shift registers connected in series for providing temporary storage and shifting of consecutive samples therethrough, also providing the last samples fifteen and sixteen, the intermediate samples seven through fifteen inclusive, and the first samples one, two and three therefrom, and for receiving restored data for substitution of intermediate samples that are distorted; and a first subtractor connected to receive the last samples for providing the first signal therefrom.

3. The apparatus of claim 1 wherein said second storage means comprises:

second difference means connected to receive the first signal for providing differences thereof;

a plurality of second shift registers connected in series for providing temporary storage and shifting of consecutive differences of the first signal, providing the fourth signal therefrom and receiving the seventh signal; and a first adder connected to receive the fourth signal from the last four of said second registers for providing the fifth signal.

4. The apparatus of claim 1 wherein said restorer means comprises:

a selectable binary divider connected to receive one of a plurality of the second signal (A) for providing a reference signal (R);

comparator means connected to compare the fourth signals and the reference signal (R) for providing a signal therefrom indicative of excessive second differences;

set membership determiner means connected to receive said comparator means output signal for providing a signal therefrom indicative of members of a set of excessive second differences;

distortion verifier means connected to receive said set membership determiner means output signal, said comparator means output signal and the fourth signal for providing a signal (Z) indicative of distortion of the samples;

set size storer means connected to receive said set membership determiner means output signal and said distortion verifier signal (Z) for providing temporary storage and output of said determiner's output signal; and restorer means connected to receive said set size storer means output signal and the second signal (A) for providing the sixth and seventh signals (B and C).

5. The apparatus of claim 1 wherein said third storage means comprises:

a plurality of third shift registers connected in series for providing temporary storage and shifting of consecutive fifth signal therethrough and therefrom;

a second adder connected to receive the fifth signal from said third shift register for providing the sum thereof; and a plurality of fourth shift registers connected in series for providing temporary storage and shifting of consecutive eighth signals and output thereof.

6. The apparatus of claim 1 wherein said selector means comprises:

averager means connected to receive the third signal (D) and one of the plurality of eighth signals for providing a smoothed data signal;

peak selector means for providing a signal indicating when a preselected peak threshold has been exceeded by at least one of the eighth signals and also for providing a signal indicating when the peak threshold will be exceeded during a succeeding time increment;

cumulative selector means for providing a signal indicating when both a preselected cumulative shift threshold has been exceeded by the third storage means and a preselected cumulative second-sliding-sum threshold has been exceeded;

force selector means for providing a signal indicating when the total number of shifting operations in the third storage means exceeds a preselected force threshold; and gating means connected to receive the signals from said peak selector means, said cumulative selector means, said force selector means, and the smoothed data signal from said averager means, for outputting said smoothed data signal whenever one of the peak selector, cumulative detector, or force selector signals are present.

* * * * *